(12) United States Patent  (10) Patent No.: US 8,504,957 B2
Newcomb  (45) Date of Patent: Aug. 6, 2013

(54) AUTOMATED IDENTIFICATION OF POWER AND GROUND NETS IN AN INTEGRATED CIRCUIT NETLIST

(76) Inventor: Jesse Conrad Newcomb, Daly City, CA (US)

( * ) Notice: Subject to any disclaimer, the term of this patent is extended or adjusted under 35 U.S.C. 154(b) by 0 days.

(21) Appl. No.: 13/401,704

(22) Filed: Feb. 21, 2012

(65) Prior Publication Data

US 2012/0151427 A1   Jun. 14, 2012

Related U.S. Application Data

(63) Continuation-in-part of application No. 13/345,721, filed on Jan. 8, 2012, which is a continuation-in-part of application No. 12/694,199, filed on Jan. 26, 2010, now Pat. No. 8,225,251.

(60) Provisional application No. 61/183,405, filed on Jun. 2, 2009, provisional application No. 61/476,320, filed on Apr. 17, 2011, provisional application No. 61/543,395, filed on Oct. 5, 2011.

(51) Int. Cl.
*G06F 17/50* (2006.01)

(52) U.S. Cl.
USPC ............ 716/109; 716/101; 716/106; 716/136

(58) Field of Classification Search
USPC .......................... 716/100, 101, 106, 109, 136
See application file for complete search history.

(56) References Cited

U.S. PATENT DOCUMENTS

| | | |
|---|---|---|
| 7,917,877 B2 * | 3/2011 | Singh et al. .................... 716/118 |
| 2012/0151427 A1 * | 6/2012 | Newcomb ...................... 716/109 |
| 2012/0266121 A1 * | 10/2012 | Newcomb ...................... 716/109 |
| 2012/0266122 A1 * | 10/2012 | Newcomb et al. ............ 716/109 |

* cited by examiner

*Primary Examiner* — Sun Lin
(74) *Attorney, Agent, or Firm* — Stephen E. Zweig

(57) ABSTRACT

A computerized method of automatically identifying nets that are statistically likely to be power or ground nets in a complex integrated circuit design. The method, which does not require a-priori information, operates by determining electrical properties of each device or device terminal that is coupled to an analyzed net, and creating a mathematical description of overall electrical properties of these various devices. The method will then compare this mathematical description with at least various preset mathematical descriptions of power nets or a ground nets. If the mathematical description fits, the invention will at least provisionally determine that said analyzed net is a power net or a ground net. The invention may also determine likely voltages for these various power nets.

21 Claims, 11 Drawing Sheets

Fig. 8

| Determining Factor | Power Rail | Ground Rail |
|---|---|---|
| Coupling to Large number of Devices | 7 | 7 |
| Coupled to Large number of PMOS Transistors | 10 | - 18 |
| Coupled to Large number of NMOS Transistors | - 20 | 10 |
| Coupled to NMOS bulk terminal | - 4 | 2 |
| Coupled to cathode terminal side of Diode | 2 | - 3 |
| Coupled to Capitor | 0 | 3 |

AUTOMATED IDENTIFICATION OF POWER AND GROUND NETS IN AN INTEGRATED CIRCUIT NETLIST

CROSS REFERENCE TO RELATED APPLICATIONS

This application is a continuation in part of patent application Ser. No. 13/345,721, METHOD OF PREDICTING ELECTRONIC CIRCUIT FLOATING GATES", inventor Jesse Conrad Newcomb, filed Jan. 8, 2012; Ser. No. 13/345,721 in turn is a continuation in part of patent application Ser. No. 12/694,199, "Circuit States", inventor Jesse Conrad Newcomb, filed Jan. 26, 2010, now U.S. Pat. No. 8,225,251; application Ser. No. 12/694,199 in turn claimed the priority benefit of U.S. provisional application 61/183,405, "Floating Gate Predictor", inventor Jesse Conrad Newcomb, filed Jun. 2, 2009; this application also claims the priority benefit of U.S. provisional application 61/476,320, "Analysis of Electronic Circuits", Inventor Jesse Conrad Newcomb, filed Apr. 17, 2011; this application also claims the priority benefit of U.S. provisional application 61/543,395, "Analyzer of Electronic Circuits", Inventor Jesse Conrad Newcomb, filed Oct. 5, 2011.

FIELD OF THE INVENTION

Embodiments of the present invention relate in general to the field of automated (e.g. computer assisted) integrated circuit chip design, simulation, and analysis tools.

DESCRIPTION OF THE RELATED ART

Modern integrated circuit chips are highly complex devices, often consisting of at least 100,000 nets, more than 100,000 transistors, more than 500 cell definitions and the like. They are often served internally by a plurality of different power supply and ground rails, often in excess of five or more power supply rails per chip. Indeed modern integrated circuits are often vastly more complex than these conservative numbers, and may have millions and even billions of different transistors and other internal devices.

Such chips are typically designed and debugged by teams of engineers from many different engineering specialties. The overall chip design is far too complex for any one person to completely understand, and although automated design tools greatly help facilitate the process, human input still plays a large role in chip design.

Due to the natural problems encountered when coordinating large groups of engineers engaged in such complex designs, not all design decisions are optimal. For example, consider the problem of routing various types of different power and ground rails to various sections of a complex integrated circuit. It is often possible that due to less than optimal naming choices, a power or ground rail may be labeled with a cryptic name, such as "net3456" that does not clearly reveal what its true purpose is.

Complex integrated circuits can also have a large number of input and output terminals, often hundreds or more terminals, and to properly analyze and debug the chip design, the user in charge of computer debugging or simulation of the chip design must setup the analysis by entering in a list of inputs, such as which terminals have voltage, which are ground, and what the proper voltages and grounds are. If that setup list of which terminals get what input voltages is incorrect, then the subsequent analysis of the chip will be incorrect.

As a result, due to unclear labeling, less than optimal communication between team members as to what portions of the integrated circuit serve as power and ground rails, and mistakes in setup parameters, the efficiency of analysis and debug of complex integrated circuits is presently at a less than optimal state.

Stated alternatively, integrated circuit chip design involves a close interaction between specialized circuit hardware engineers and computer software programmers. These people coordinate their efforts to arrive at a solution that requires both circuit and programming expertise. Most circuit engineers do not have the programming skills necessary for complex evaluation of large circuit netlists, such as a full chip. Most software programmers do not have the circuit hardware knowledge necessary to troubleshoot a circuit. The process of troubleshooting a circuit design usually requires more skills than a single person can provide.

When troubleshooting circuits, a netlist may be used to evaluate the connections and topology by meticulously confirming that each device is appropriately coupled to other devices and/or that each device is appropriate for the intended function. For example, by segmenting the circuit into specific areas, such as net identification, to determine potential problems. Unfortunately, with large circuits, such an approach could take a long time.

BRIEF SUMMARY OF THE INVENTION

The invention is based, in part, on the insight that the information contained in an integrated circuit netlist—that is the computer file of the integrated circuit chip design that contains a description of the various chip devices, device topology, device connectivity, and the topology of circuit connections between devices, contains much inherent information that logically pertains as to which portions of the circuit are likely to be functioning as power rails, and even the likely voltages of those portions of the circuit that are likely functioning as power rails.

The invention is also based, in part, on the insight that a suitable software based analysis tool could, in principle, be designed to analyze the netlist of a complex integrated circuit, and even in the absence of other a-priori information (e.g. in the absence of a specification as to what portions of the circuit are functioning as power rails, and the likely voltages of these power rails) extract this information from the netlist.

This invention is also based, in part, on the insight that an independent analysis of what portions of an integrated circuit chip are functioning as power rails, and the likely voltages of these power rails, could serve as a highly useful integrated circuit analysis and debug tool. It would help engineers identify errors in their setup lists, help debug complex integrated circuit design errors, and help ensure accurate simulations and assist in many other types of chip analysis as well.

Systems and methods for identifying a rail within a circuit are discussed herein. The method comprises, locating a net within a netlist, identifying one or more devices coupled to the net, at least partially based on the one or more devices determining if the net is a power rail, and reporting the net determination.

In one embodiment, the invention may be a method of automatically identifying, in the netlist specification of a complex integrated circuit chip comprising a plurality of nets, without requiring a-prioi knowledge of which of said nets are power or ground nets, those nets that are statistically likely to be power or ground nets. This method will generally comprise representing the netlist in computer readable form, and using at least one computer processor, software, and memory to analyze said individual nets from this netlist. For each individual net so analyzed, the invention will generally determine the electrical properties of each device or device terminal that is coupled to the analyzed net, and sort the electrical properties for each device or device terminal into a series of bins, thereby creating an overall mathematical description of the overall electrical properties of the various devices that are coupled to this particular analyzed net. The method will then compare this mathematical description with at least one preset mathematical description of a power net or a ground net. If the overall mathematical description falls within at least one preset mathematical description of a power net or a ground net, then the invention will at least provisionally determine that this particular analyzed net is a power net or a ground net, and at least store this determination in memory for later use.

Other embodiments, in which the further netlist information about the type of device and the topology of the device can also be used to accurately estimate the likely voltage of the power net will also be discussed.

BRIEF DESCRIPTION OF THE DRAWINGS

FIG. 8 illustrates a table of determining factors.

DETAILED DESCRIPTION OF THE INVENTION

Figure 1:
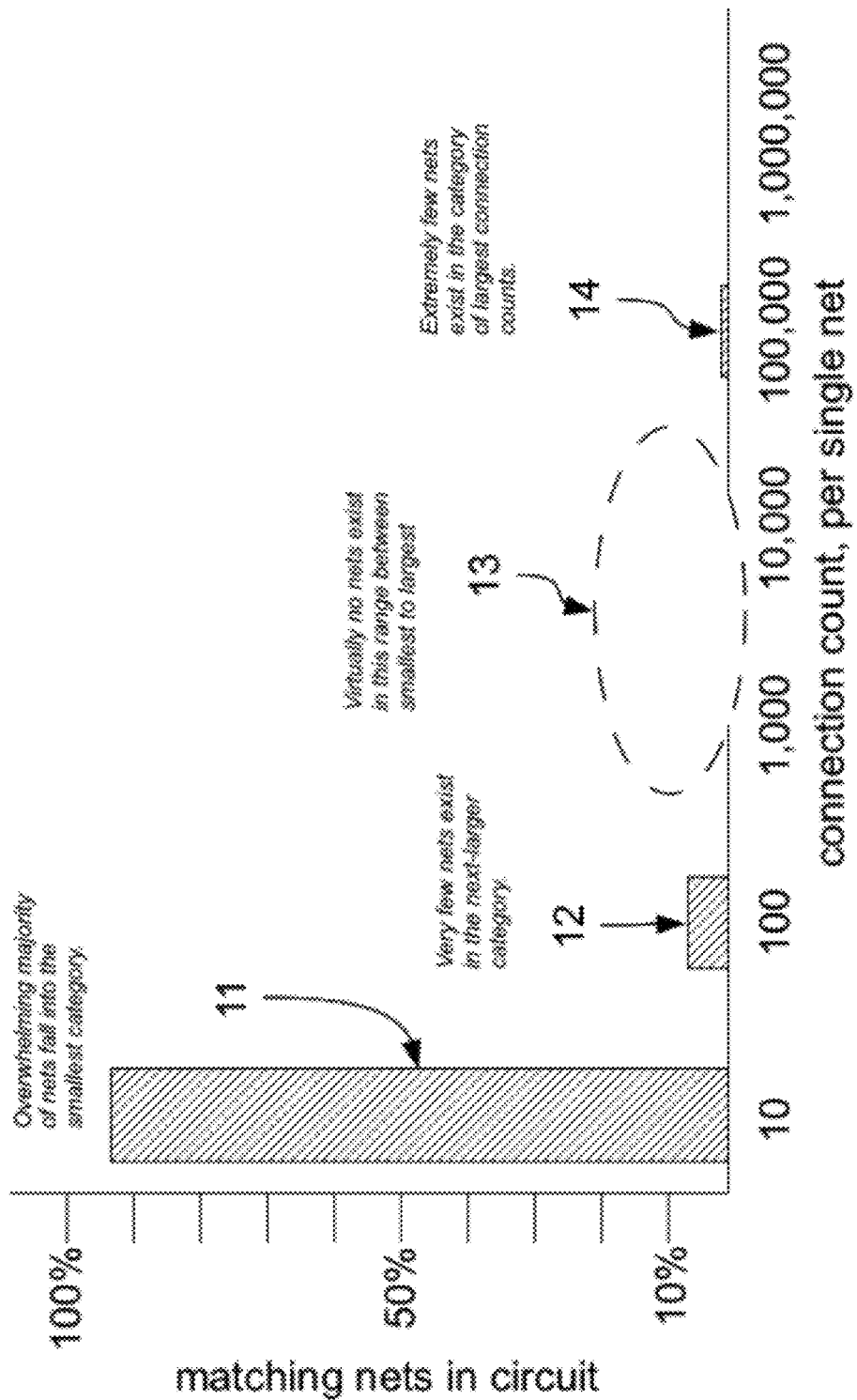
FIG. 1 shows the statistical distribution of power/ground nets vs. other nets within a circuit.

In the following description, numerous specific details are set forth in order to provide a thorough understanding. However, alternatively some embodiments may be practiced without these specific details. In other instances, well known methods, procedures, and components have not been described in detail as not to unnecessarily obscure aspects of the present invention.

As defined herein, a circuit element is a device or a net. A device may be any circuit component, such as a transistor. A device terminal is used to couple the device to another device or a net.

In some embodiments, the invention may be a method for identifying a rail within a circuit by locating a net within a netlist, and identifying one or more devices coupled to the net. Then, at least partially based on the identity of these one or more devices, the invention will determine if the net is a power rail or a ground rail, and report the results. These methods will be discussed further herein.

Identifying Root Power/Ground Rails

In one embodiment, nets and devices are identified in a circuit represented in a netlist. A net may be identified and/or determined to be a power rail or a ground rail. Also, a net may be determined not to be a power rail or not to be a ground rail. This method helps to identify power and ground nets that the user has not previously identified in a netlist, as well as power or ground nets that the user has previously wrongly identified in a netlist. For example, if a net has been labeled as a power rail, but in all instances in a netlist, the net acts and functions as a ground rail and is determined to be a ground rail, the net will be reported to be a ground rail, and optionally the misidentification will also be reported.

The identification a nets power or ground rail status is based on one or more determining factors. Such determining factors include the topology of the circuit, the number of devices coupled to the net, the percentage of the netlist devices coupled to the net, the percentage of the various types of device coupled to net, the mix of types of devices coupled to net, or the types of various device terminals coupled to the net. In one embodiment, the determination is based on two or more such determining factors.

Often, the identification of power and ground rails (power/ground rails) may rely on some basic concepts, related to the particular nets themselves, as well as the overall circuit. In one embodiment, the statistical profiles of the overall circuit may be considered.

This approach is based on the insight that most nets in a typical circuit are relatively small nets, each having relatively few connections. Examples of such small nets include the signals between one output driver and another input receiver. By contrast, nets that function as power or ground rails (power/ground rails) generally have far more connections. These single power and ground nets often form a large net that powers whole blocks of circuitry. The approach is also based on the insight that in a typical integrated circuit chip, there are very few nets of intermediate size—that is nets that fall into the range of connection counts between the smallest and the largest.

There are a few exceptions to this rule, however. For example, in some types of circuits, such as random-access memory, there will exist higher numbers of these intermediate nets, such as memory read/write bit lines. These exceptions are generally few enough in number that they can be readily handled as explicit exceptions by the various algorithms and computer software that implement the invention.

Thus, one embodiment of the invention uses such determining factors gathered from statistical observations of the overall circuit, where the largest nets are determined to be the power/ground rails.

Figure 2:
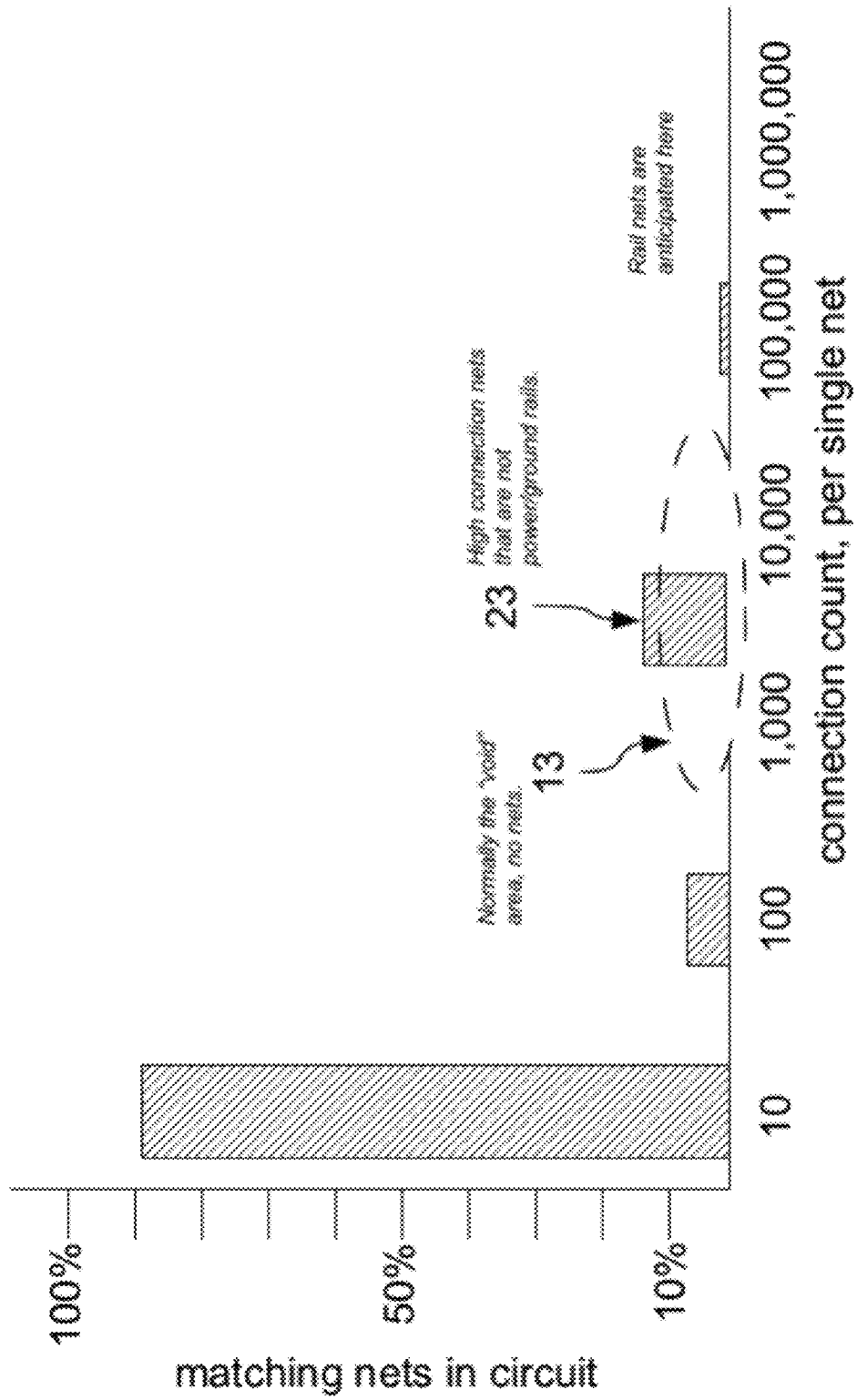
FIG. 2 shows some of the anomalies that can disrupt the expected statistical distribution of nets within a circuit.

Examples of these statistical trends are shown in FIG. 1 and FIG. 2. FIG. 1 shows the statistical distribution of power/ground nets vs. other nets within a circuit. Note that for a typical integrated circuit netlist, the overwhelming majority of the nets have only between about 0-10 device connections, and that there are usually very few nets that have between about 1,000 to 10,000 device connections.

FIG. 2 shows some of the anomalies that can disrupt the expected statistical distribution of nets within a circuit. In some types of integrated circuit chips, such as random access memory, there can be certain nets that have a high number of device connections (e.g. between about 1,000 to 10,000 device connections), yet these high connection nets are not power or ground rails. As previously discussed, the invention's methods can handle this type of integrated circuit chip as an exception.

In one embodiment, the net is determined using a heuristic trial and error approach based on two or more determining factors. In this heuristic approach, a net is first provisionally determined to be a power rail or ground rail candidate based on first determining factor, and then based on a second determining factor, the probability that the net is a power or ground rail candidate increases, decreases, or remains the same. This process can optionally be repeated with other determining factors until there are no more determining factors to evaluate.

In one embodiment, the process continues by evaluating other determining factors until the probability that the net is a power or ground rail is either determined with a high confidence, or no other determining factors are available for the determination. For these purposes, "a high confidence" may be a statistical percentage, such as 95% probability. Alternatively, the method may use a topological or logical based decision process that determines that net in question must logically a power rail or ground rail, because no other net in that local device's vicinity is a power or ground raid candidate. Here the method uses a process of elimination to make the determination.

Thus when the method uses a heuristic approach, this heuristic approach may be a one-step, two-step, or a multiple step approach, as discussed further herein. For example, in a two step approach, a net is first determined to be a potential power rail, and based on further review is determined to be a power rail, that is, a power rail with a high certainty.

As previously discussed, in one embodiment, the invention may be a method of automatically identifying, in the netlist specification of a complex integrated circuit chip comprising a plurality of nets, without requiring a-priori knowledge of which of said nets are power or ground nets, those nets that are statistically likely to be power or ground nets. This method will generally comprise representing the netlist in computer readable form, and using at least one computer processor, software, and memory to analyze said individual nets from this netlist. For each individual net so analyzed, the invention will generally determine the electrical properties of each device and/or device terminal that is coupled to the analyzed net, and sort the electrical properties for each device or device terminal into a series of bins, thereby creating an overall mathematical description of the overall electrical properties of the various devices that are coupled to this particular analyzed net. The method will then compare this mathematical description with at least one preset mathematical description of a power net or a ground net. If the overall mathematical description falls within at least one preset mathematical description of a power net or a ground net, then the invention will at least provisionally determine that this particular analyzed net is a power net or a ground net, and at least store this determination in memory for later use.

Here, the binning process will typically have two aspects. The invention's method will typically both bin the types of devices (e.g. count the number of NMOS transistors connected to that particular analyzed net), and also bin the type of connection to the devices (e.g. count how many NMOS bulk terminal pins are connected to that particular analyzed net). Similarly for other devices such as diodes, the method will both bin the number of diodes, and also bin the number of anode diode connections to the analyzed net, the number of cathode diode connections to the analyzed net, and so on. Thus in principle the number of different bins will be at least the number of different types of devices, plus the number of bins for each type of device connection to the analyzed net.

Figure 3:
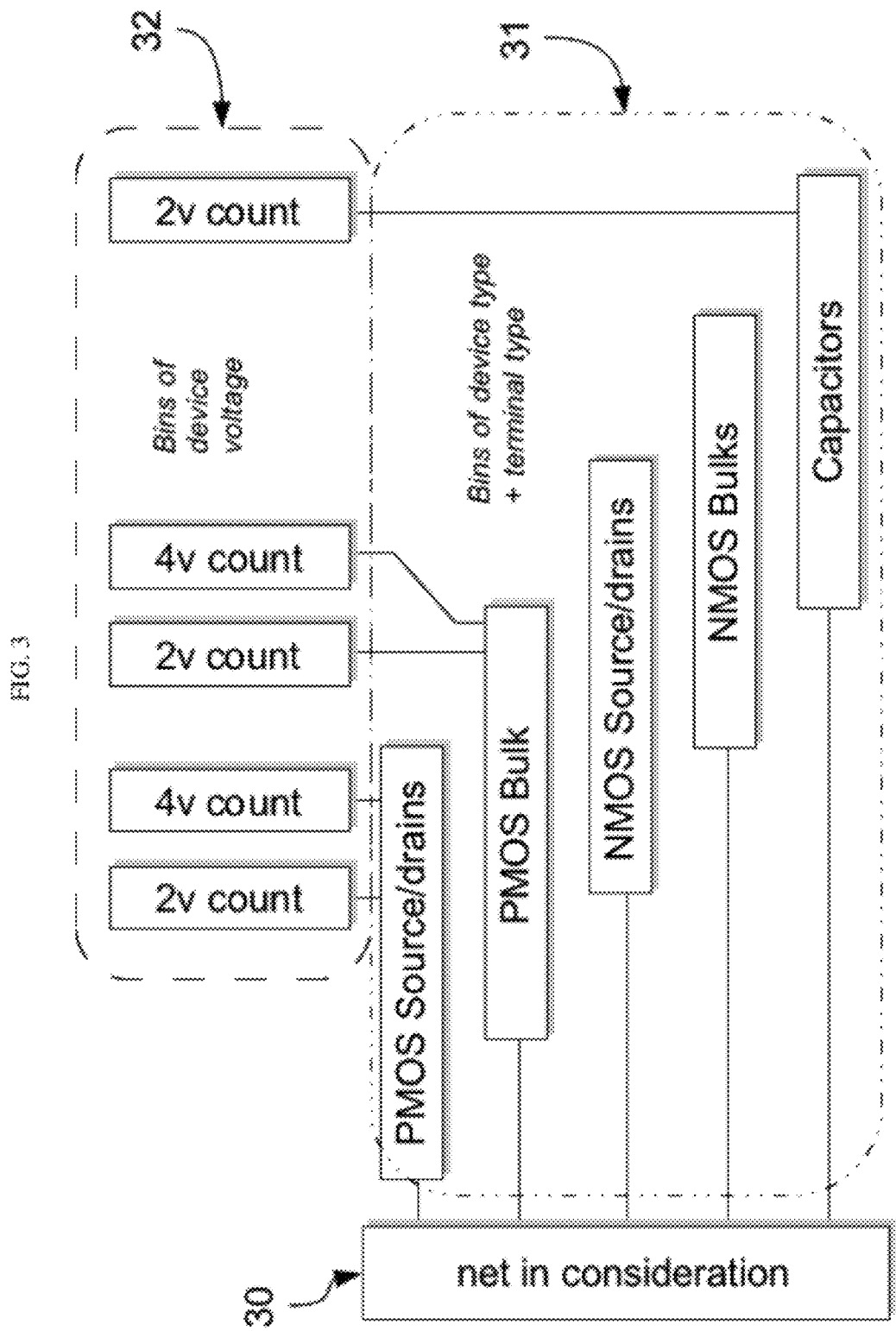
FIG. 3 shows some of the bins that can be used to count device connections per net.

FIG. 3 illustrates a binning mechanism that organizes and counts the connections and connection types for a particular net. This will be discussed in more detail shortly.

Thus for example, the devices may include PMOS transistors, NMOS transistors, diodes, and capacitors, and the bins may comprise a total number of device terminals coupled to the analyzed net, a PMOS transistor bulk terminal bin, a PMOS transistor source and drain terminal bin, a NMOS transistor bulk terminal bin, a NMOS transistor source and drain terminal bin, a diode cathode bin, a diode anode bin, a capacitor terminal bin, and so on. Mathematically, each analyzed net thus can be considered to be an n-dimensional vector, where each vector dimension corresponds to a particular bin, and the count number of each bin in turn expresses the magnitude of that n-dimensional vector at that particular dimension.

The invention's software based algorithms may then compare this mathematical description of the devices connected to a particular analyzed net to a variety of different criteria that are generally associated with an ideal power net or ground net. For example, in one scheme, at least one of the preset mathematical descriptions of a power net or a ground net can be that: the bin indicating that the analyzed net is coupled to a capacitor has a capacitor count that is greater than a preset percentage of the total number of device terminals coupled to analyzed net, and is also greater than one. This "preset percentage of the total number of device terminals coupled to the analyzed net" value can either be a constant stored in the system memory of the computer running the algorithm, or be set by the operator of the system, or entered in by other method.

Figure 4:
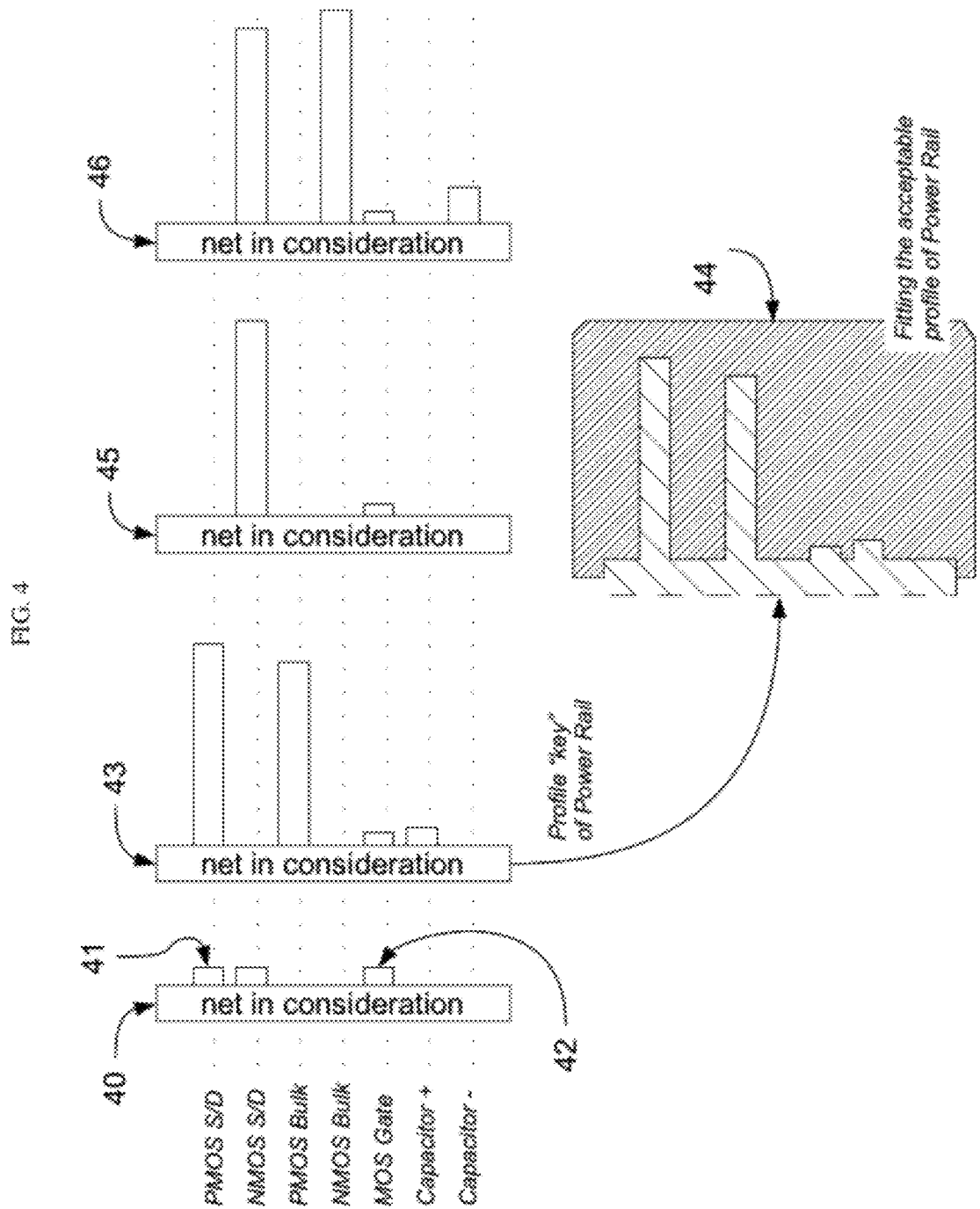
FIG. 4 shows some examples of both false and true power and ground rails, and how these profiles fit into various preset acceptance criteria.

FIG. 4 gives examples of nets that match, or don't match, the profiles of acceptable power/ground rails. This will also be discussed in more detail shortly.

The total number of each type of different device in the analyzed netlist also contains useful information as well, and is particularly useful for adjusting or normalizing some of the information contained in the other bins. Thus for example, in some embodiments, the algorithm or method will use the total number of each type of different device in the netlist to adjust the preset mathematical description of a power net or ground net, and then use this adjusted or normalized mathematical description of a power net or ground net to at least provisionally determine that said analyzed net is a power net or a ground net. This way, for example, if one analyzed net has twice the number of devices as another analyzed net, then the analysis can be corrected for the overall difference in the total number of devices.

The invention's algorithm or method is somewhat tunable, and can be adjusted according to the type of integrated circuit that is being analyzed. For example, consider the case where the various preset mathematical descriptions of a power net or ground net are, for one reason or another, too stringent so that on the first iteration of the analysis, the total number of provisionally determined power nets or ground nets is below a preset minimum (e.g. perhaps 10 power nets might be expected for this type of circuit, and only one is reported). Here, the sensitivity of the analysis can be adjusted by, for example, making the at least one preset mathematical description of a power net or ground net progressively less stringent, and repeating the analysis until the total number of provisionally determined power nets or ground nets exceeds the preset minimum.

The invention's algorithms may also further reevaluate a provisional determination that the analyzed net is a power net or ground net by analyzing the topology of the netlist. Here, for example, if two provisionally determined power nets are found to be serving the same devices, then it is more likely the case that only one provisionally determined power net is a true power net. The invention may then choose one provisionally determined power net as being a true power net, and determine that the other provisionally determined power net is not a true power net. This may be done, for example, by looking at the details of the original provisional power net determinations, and determining which of the two power nets in contention had a higher ranking. Other methods may also be used.

Determination of Voltage for Power Rails

The invention's algorithms may further be to determine the likely voltage of the various provisionally determined power nets. Here, this likely voltage can be determined by, for each provisionally determined power net, analyzing the voltage requirements of each device or device terminal that is coupled to the provisionally determined power net, and determining a likely voltage that is consistent with the voltage requirements of each device or device terminal that is coupled to the provisionally determined power net.

Here, for example, for each transistor device, the software may examine the transistor's geometry (usually specified as Width and Length in the computer netlist file), and thereby determine that it is likely a high voltage device (high value of L) or a low-voltage device (low value of L). The algorithm may then use this estimate of the transistor's high- or low-voltage status to determine that the connected power net is intended to be a high- or low-voltage power net.

Alternatively, the invention's software may be configured to accept an input definition from the user as to the intended operating voltage of the transistor, and use this definition rather than the geometry based estimate for the same purpose of determining the power net's intended voltage.

Additionally, to compare any assorted/different transistor voltages, if the analyzed power net has such assorted/different connections within inconsistent voltages, the invention's method may, determine a single intended voltage, based on statistical dominance of one of the assorted transistors over the others.

Determination of Current for Power/Ground Rail

Similarly, the invention may also use the knowledge of the total number of devices connected to a power net to determine that the net is a high-current (many devices connected) or low-current net (few devices connected).

Here, the invention can use the knowledge of the total number of devices connected directly to, or indirectly between, a power rail and a corresponding ground rail, and thereby determine that the net is a high-current net (many devices) or low-current net (few devices).

Useful Applications

As previously discussed, the invention's basic methods may be used for a variety of different applications.

Typically the user often have at least some a-priori knowledge as to which integrated circuit nets are power or ground nets, but be uncertain as to if this a-priori information is entirely accurate. Here the provisional determination that said analyzed net is a power net or a ground net, provided by the invention, may be used to check the accuracy of this a-prioi information, and errors in this a-priori information may thus be spotted.

The information provided by the invention may be further used in a computerized software implemented method to identify both specific floating transistor gates, and causes of said specific floating transistor gates in an electronic circuit design comprising a plurality of electrically interconnected transistors. Here, the methods of the present invention may be used in conjunction with the methods previously described in copending and parent application 13/345,721, the contents of which are incorporated herein by reference.

The information provided by the invention may also be used in a computerized software implemented method to define power and ground nets for the purpose of running circuit simulation software.

The information provided by the invention may also be used in a computerized software implemented method to identify voltage mismatch problems in which either transistors are reached by higher voltage power than allowed, or logic stages cannot adequately switch because they are reached by lower voltage power than allowed.

The information provided by the invention may also be used in a computerized software implemented method to identify fanout problems caused by logic drivers that are served by inadequate power nets or not connected to power nets, thereby causing the logic drivers to fail desired performance requirements.

The information provided by the invention may be further used in a computerized software implemented method for integrated circuit chip layout, placement, or routing, wherein the layout, placement, or routing is directed to give priority to power nets so that either circuit blocks can be positioned near the power nets that provide their power, power nets can be physically routed and shaped according to the power they must carry.

The information provided by the invention may be further used in a computerized software implemented method for verifying integrated circuit layout.

EXAMPLES

FIG. 1 represents the statistical distribution of nets within a typical circuit, where each net is ranked by its number of connections to primitive devices such as MOS transistors, resistors, diodes, and capacitors. In the illustrated chart, a very large portion (11) of the nets have approximately 10 or fewer connections, and these nets form the overwhelming majority of nets within the circuit. By contrast, nets with between 10 and 100 connections form the next portion (12), and these are far fewer in number than the larger portion (11). Nets with even more connections, in the area (13) between 1,000 and 100,000, are almost non-existent. Lastly, nets having more than 100,000 connections do exist (14), and these are usually power/ground rails. Thus, in one embodiment, most power/ground nets will be expected to be found in the highest connection count range (14), at the high end of the chart, isolated from other nets by a void area of the chart (13).

FIG. 2 is similar to FIG. 1, and also shows the statistical distribution of nets within a typical circuit. However in FIG. 2, this integrated circuit chip has an anomaly in that there are an unusually large number of nets (23) that occupy what would normally be void area (13). This can happen when the chip incorporates blocks of random access memory (RAM), and in other situations. As previously discussed, it is important to instruct the algorithm to disregard these anomaly nets (i.e. encode this case as an exception), because otherwise this type of net can encroach on the determinations of power/ground rails (as this type of net may have characteristics similar to power/ground rails) and thereby introduce confusion and too many false positive power and ground rail determinations. Thus in some embodiments, the invention's algorithms and software will detect this type of anomaly nets (23), and remove them from further consideration. This can be done by, for example, examining other properties of the nets themselves, as discussed for FIG. 4, following.

As previously discussed, FIG. 3 illustrates a binning mechanism that organizes and counts the connections and connection types for a particular net.

FIG. 4 also as previously discussed, gives further examples of nets that match, or don't match, the profiles of acceptable power/ground rails. In this example, a net in consideration (40) has a low number of PMOS source/drain connections, as represented by bar 41, and a similarly low number of NMOS source/drain connections, as well as a low number of MOS gate connections (42), thereby making an overall profile for this particular net 40. In comparison, another net in consideration (43) has a much higher number of PMOS source/drain connections and PMOS bulk connections, thereby forming a different profile than other nets. This different profile of net 43 meets a specific profile of a hypothetical power net, which has a general representation (44). This general representation 44 is essentially a statistical "keyway" into which only certain nets meeting the same profile, such as net 43, can fit. Furthermore, other nets provide yet other profiles (45 and 46), or "keys", of different shapes that will not meet the profile (44) of a power net. These keys are thus additional preset mathematical descriptions of power nets or ground nets, which can be used by the invention's algorithms and software to further distinguish among the various nets.

Figure 5:
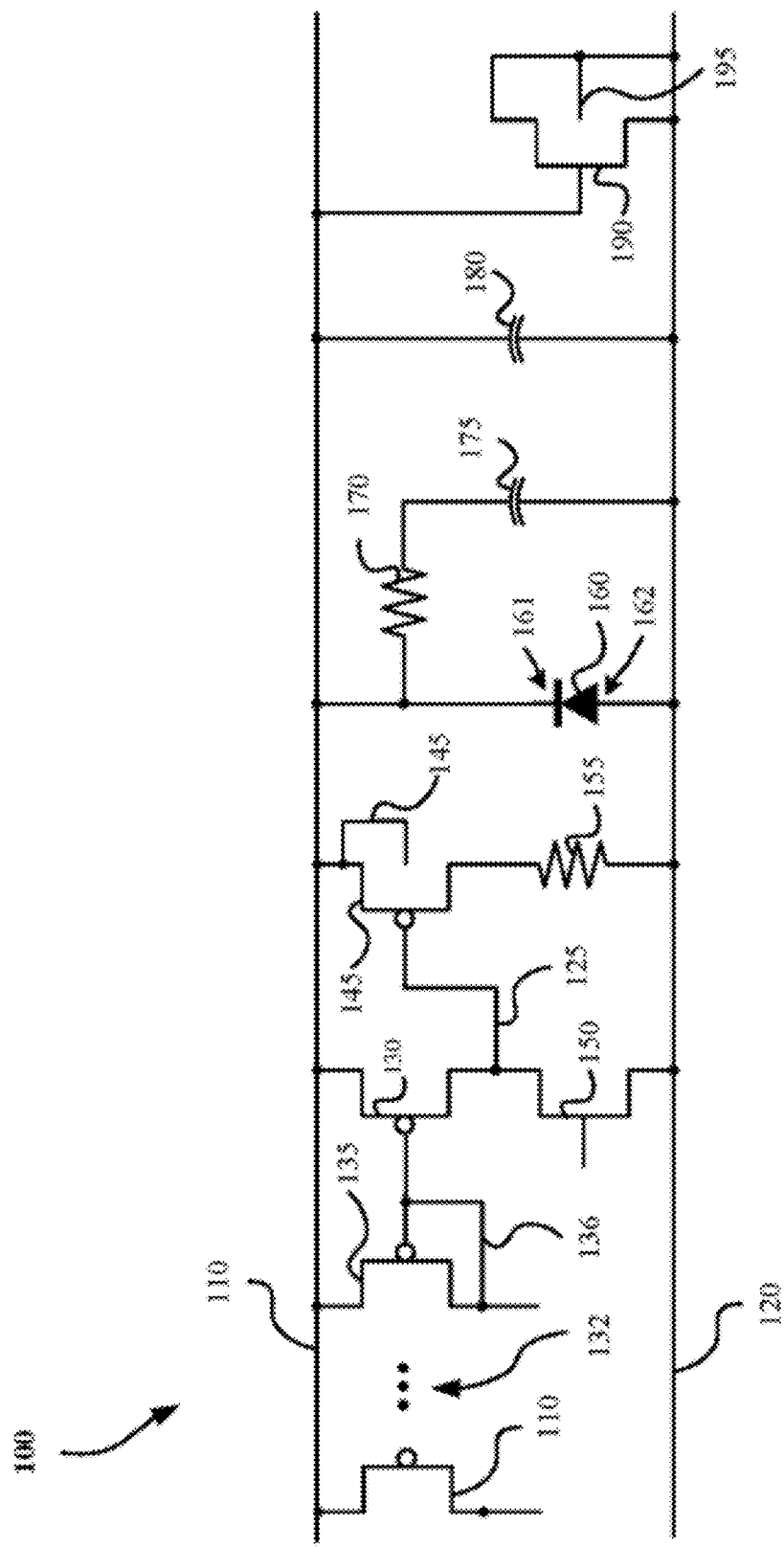
FIG. 5 illustrates a circuit with a potential power rail.

FIG. 5 illustrates a circuit (100) with a potential power rail. As used for discussion herein, this circuit is an example of a portion of the overall netlist. As depicted, the circuit (100) contains many devices including a net (110), a net (120), a net (125), a PMOS transistor (130), a PMOS transistor (135), a PMOS transistor (140), a PMOS transistor (145), an NMOS transistor (150), a diode (160), a resistor (170), a capacitor (175), a capacitor (180), and an NMOS transistor (190). Each of these devices separately or severally, as well as the various device terminal couplings may be a determining factor to determine if the nets (110), (120), and (125) are power rails, ground rails, not power rails, and/or not ground rails. A multiple PMOS transistor three-dot symbol ("three dots") (132) represent multiple PMOS transistors coupled to the net (110). A bulk terminal (147) of the PMOS transistor (145) is coupled to the net (110).

In one embodiment, some of the determining factors that favorably indicate to the algorithm that the net (110) is a power rail are, as illustrated by the following examples, are 1) a high number of PMOS transistor couplings to a net, such as PMOS transistors (130), (135), (140) and (145) and the multiple PMOS transistor symbol (132), as discussed herein; 2) a relatively large number of device couplings, such as the couplings of PMOS transistors (130), (135), (140), (145), the multiple PMOS transistor three-dot symbol (132), diode (160), resistor (170), capacitor (180), and NMOS transistor (190) compared to a total number of devices in the netlist, as discussed herein; 3) the diode (160) has a cathode terminal side (161) coupled to net (110); (4) the capacitor (180) is coupled to the net (110); 5) the NMOS transistor (190) is being used as a capacitor and connected to the net (110); 6) the PMOS transistors (135) and (140) are wired in a current mirror and coupled to the net (110); and 7) the bulk terminal (147) of the PMOS transistor (145) is coupled to the net.

In one embodiment, the high number of PMOS transistor couplings to the net is based on a "relatively" high number of PMOS transistors that are coupled to the net compared to a total number of PMOS transistors in the netlist. For example, if there are 60 PMOS transistors coupled to Net A and the total number of PMOS transistors is 100 in the netlist, 60 of 100 is a relatively high number. In another embodiment, the high number of PMOS transistors couplings to the net is based a relatively high number of PMOS transistors that are coupled to the net compared to PMOS transistors coupled to other nets. For example, if there are 60, 20, and 5 PMOS transistors coupled to Net A, Net B, and Net C, respectively, then Net A would be considered a higher candidate to be a power rail than both Net B and Net C, based on having the most PMOS transistors of the three nets. Alternatively some embodiments may be practiced without such specific details, such as a relatively high number of devices, PMOS transistors, may also be construed as a relatively high percentage of devices. For example, 60% of devices may be considered a relatively high number of devices.

In one embodiment, the relatively large number of device couplings to one net is based on the net compared to the netlist. For example, if a net is coupled to 10% of all the devices in a netlist, the net is considered to have a relatively large number of device couplings. In another embodiment, the relatively large number of device couplings to one net is based on numbers of couplings to other nets as compared to the netlist. For example, if Net A, Net B and Net C are coupled to 20%, 15% and 10% of the devices of a netlist, respectively, then Net A is considered a higher candidate to be a power rail than Net B and Net C, and Net B is a higher candidate to be a power rail than Net C.

In one embodiment, a net coupled to a diode where the coupling is a cathode terminal side, such as the cathode terminal side (161) of diode (160), is a positive determining factor, which has an effect of increasing the likelihood for the net to be a power rail. Additionally, when determining if the net is a ground rail, a net coupled to a diode where the coupling is a cathode terminal side has an effective negative determining factor, which has an effect of decreasing the likelihood that the net is a power rail, as further discussed herein. On the other hand, if an anode terminal side of a cathode, such as an anode terminal side (162) of the diode (160), is coupled to a net, a determining factor would be negative for a power rail and positive for a ground rail.

In one embodiment, a determining factor to identify a net to be a power rail (or a drain rail) is based on the coupling of a particular device type to the net. For example, as discussed herein, devices that are coupled to a net that have a positive determining factor to identify a net is a power rail are a capacitor, an NMOS transistor (being used as a capacitor), a PMOS transistor, and PMOS transistors wired in a current mirror.

In one embodiment, typically, if a determining factor based on a coupling of a device is positive to identify a net as a power rail, the same determining factor is negative to identify a net as a ground rail, and vice versa. For example, if a PMOS transistor is coupled to a net, such as PMOS transistor (140) coupled to net (110), then the coupling would be a positive determining factor that net is a power rail and a negative determining factor that the net is not a ground rail.

In one embodiment, some determining factors to favorably indicate that the net (120) is a ground rail are, as illustrated by the following examples, 1) a high number of NMOS transistor couplings to the net, such as NMOS transistors (150) and (190), as discussed herein; 2) a relatively large number of device couplings, such as the couplings of NMOS transistors (150) and (190), transistor (155), diode (160), and capacitors (175) and (180); 3) the diode (160) has an anode terminal side (162) coupled to net (120); 4) the capacitors (175) and (180) are coupled to the net (120); 5) the NMOS transistor (150) coupled to the net; 6) the NMOS transistor (190) is being used as a capacitor and coupled to the net (120); and 7) the bulk terminal (192) of the NMOS transistor (190) is coupled to the net (120).

The high number of NMOS transistor couplings to the net can be used to help determine that the net is a ground rail. Similarly a high number of PMOS transistor couplings to a net can be used to help determine that the net is a power rail.

As previously discussed, generally the finding that a relatively large number of device couplings are coupled to the net also increases the probability that the net is a power rail or ground rail.

As discussed, other power rail determining factors can also be used to indicate that a net is or is not a power rail; and other ground rail determining factors can be used to indicate that a net is or is not a ground rail. In one embodiment, these additional determining factors can have two ratings, one rating each for a potential power rail and for a potential ground rail. Here a positive rating indicates a positive propensity, zero indicates a neutral propensity, or and a negative rating indicates a negative propensity that the net is a power rail or a ground rail. In another embodiment the various determining factors can have more than two ratings, such as individual ratings to influence a power rail, a potential power rail, not a power rail, a ground rail, a potential ground rail, and not a ground rail.

Figure 6:
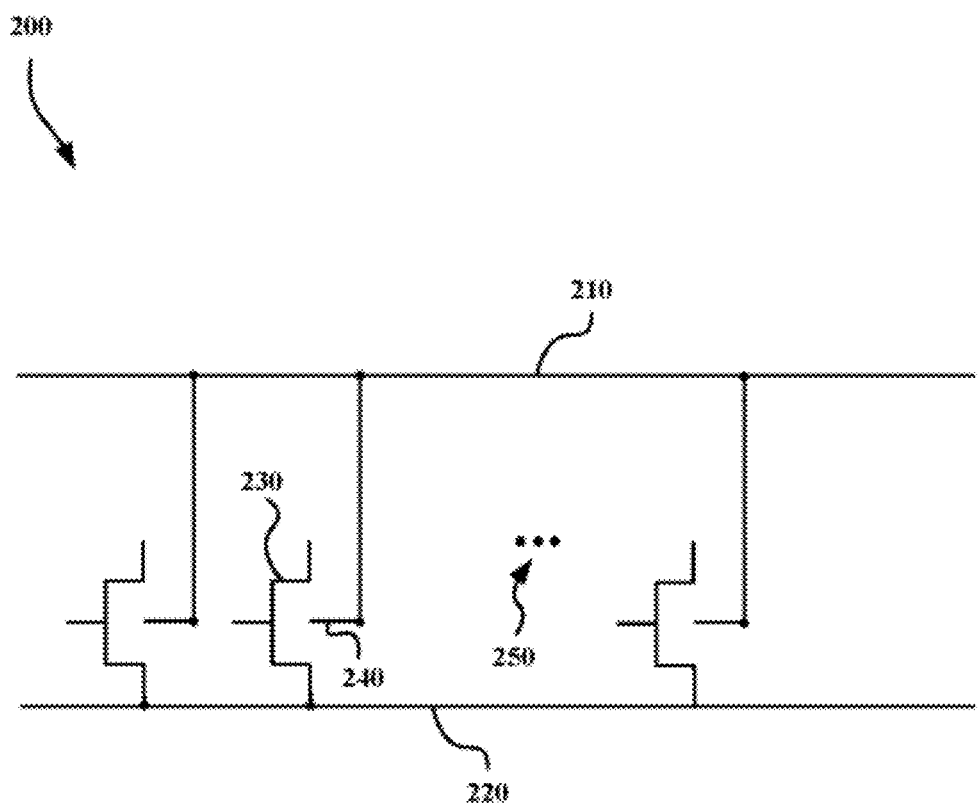
FIG. 6 illustrates a circuit, with a potential ground rail that has a low propensity to be a ground rail.

FIG. 6 illustrates a circuit (200) with a potential ground rail that has a low propensity to be a ground rail. The circuit (200) contains nets (210) and (220) and several NMOS transistors, such as NMOS transistor (230). A source/drain terminal of the NMOS transistor (230) is coupled to the net (220). A bulk terminal (240) of NMOS transistor (230) is coupled to the net (210). A multiple NMOS transistor three-dot symbol (250) represents multiple NMOS transistors coupled to the net (220) at a source/drain terminal and coupled to the net (210) at a bulk terminal in similar arrangement as NMOS transistor (230) is coupled to the nets (210) and (220).

A positive influencing ground rail determining factor (as well as a positive influencing power rail factor) is a high number of device couplings, as nets (210) and (220) both have. In one embodiment, after a net is determined to be a potential ground rail and/or a potential power rail, other determining factors are identified and/or evaluated. For example, after net (220) is identified to have a high number of device connections, the device type(s) are identified to determine if the net is more probably a power rail or a ground rail, and in this situation where the devices are NMOS transistors, the net (220) is determined to be a potential ground rail and not to be a potential power rail.

In one embodiment, after a net is determined to be either a potential power rail or a potential ground rail, more determining factors are identified and evaluated until the net is determined to be or not to be a power or a ground rail. For example, based on a high number of devices and that the devices are NMOS transistors, net (220) has been classified to be a potential ground rail, and after the potential ground rail identification, another determining factor is identified, such as a coupling of a bulk terminal, such as the bulk terminal (240), of the NMOS transistors, where in this case the bulk terminal is coupled to another net (not the potential ground rail), thus indicated that the identified potential ground rail is probably not a ground rail. The identified potential ground rail, the net (220), is probably not a ground rail based on the couplings of the bulk terminals of the NMOS transistors being coupled to another net that is indicative of a common memory array configuration used as pass rates, which identifies the net (220) to represent a memory bit-line rather than a ground rail, and thereby changes the identification of the net (220) as a potential ground rail to a net that is not a ground rail.

Figure 7:
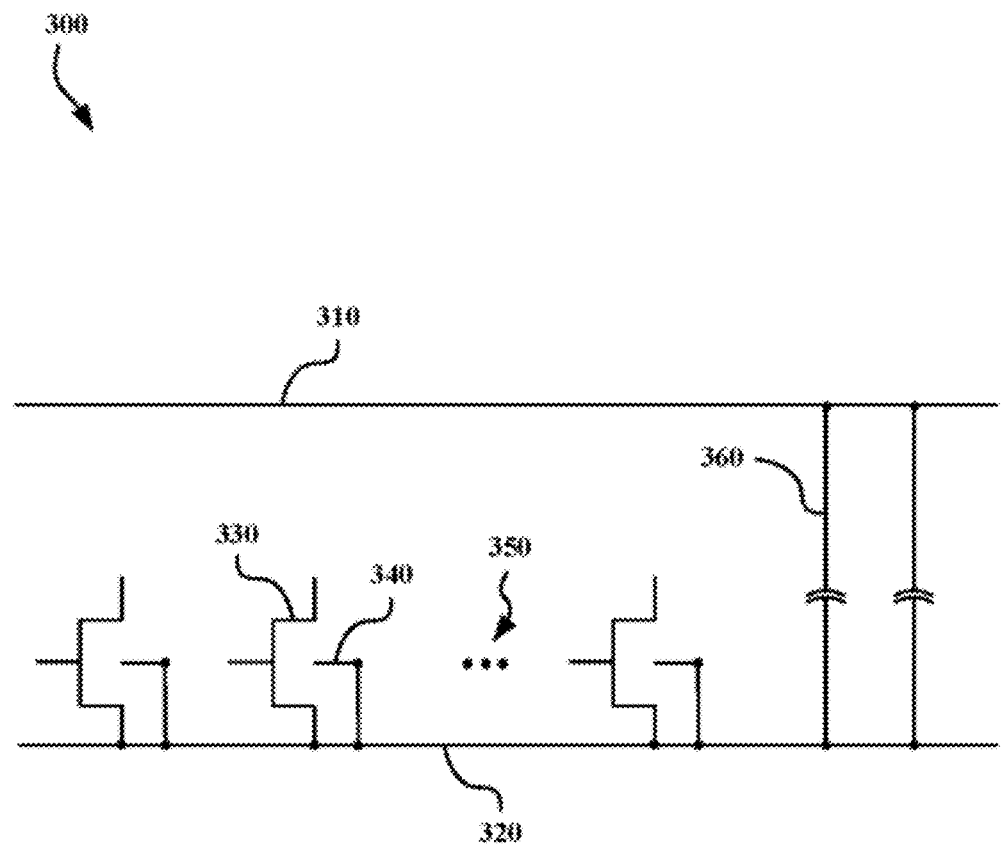
FIG. 7 illustrates a circuit, with a potential ground rail that has a high propensity to be a ground rail.

FIG. 7 illustrates a circuit (300) with a potential ground rail with a high propensity to be a ground rail. The circuit (300) contains nets (310) and (320), several NMOS transistors, such as NMOS transistor (330), and capacitors, such as a capacitor (360). A source/drain terminal of the NMOS transistor (330) is coupled to the net (320). A bulk terminal (340) of NMOS transistor (330) is coupled to the net (320). A multiple NMOS transistor three-dot symbol (350) represents multiple NMOS transistors coupled to the net (220) at a source/drain terminal and coupled to the net (220) at a bulk terminal in similar arrangement as the NMOS transistor (330) is coupled to the nets (210) and (220). The capacitors are coupled to the nets (310) and (320).

In one embodiment, a server (e.g. any type of computer used to run the invention's analysis software) determines a net identity in a two step approach. In a first step, the server uses one or more determining factors to determine and/or identify if a net is either a potential power rail and/or a potential ground rail. In a second step the server uses one or more determining factors to further determine and/or identify if the potential power rail and/or potential ground rail is a power rail or a ground rail, respectively. In one embodiment, the server determines the propensity of all the nets in a netlist prior to starting step two. In another embodiment, the server will determine the propensity of some of the nets in a netlist prior to starting step two. In still another embodiment, the server will determine the propensity of one of the nets in a netlist prior to starting step two. The server may repeat steps one and two until either all the nets have been identified or until a user-selected number of nets and/or types of nets have been identified. For example, if a user is only interested in finding power rails in a subset (subcircuit) of the netlist, the user specifies the particular subset to search for power rails. This has an advantage by reducing the determinations to a particular area rather than the whole netlist, to save time during, for example, when minor modifications are being made to the particular subset and/or to verify sections of a netlist.

As described herein, a positive influencing ground rail determining factor is a net have a high number of NMOS transistors, such as NMOS transistor (330) and NMOS transistors represented by multiple NMOS transistor three-dot symbol (350), coupled to one net, such as net (320), indicating a potential ground rail. As discussed herein a bulk terminal coupled to a net and capacitor coupled to a net are both positive determining factors to indicate a net is a ground rail. In one embodiment, in step one, as discussed above, the server determines that the net (320) is a potential ground node based on the high number of NMOS transistors, and then in step two, as discussed above, the server uses one or more additional determining factors, such as the coupling of a bulk terminator to the same net as the identified potential ground node, that is net (320), and/or a coupling of the capacitor, such as the capacitor (360), to the identified potential ground node, that is net (320), to determine if the potential ground node is a ground node.

FIG. 8 illustrates a table (400) of determining factors. As depicted, the table (400) contains six determining factors. Each determining factor has a power rail rating, as indicated under column (402) and a ground rail rating, as indicated under column (406). For example, a determining factor (420) for a net being coupled to a large number of PMOS transistors, has a power rail rating of 10 and a ground rail rating of −18 (negative eighteen). In one embodiment, a server uses the power rail ratings to determine if a net is a potential power rail, as discussed in step one herein, and/or if a potential power rail is a power rail, as discussed in step two herein. Similarly, in one embodiment, the server uses ground rail ratings to determine if a net is a potential ground rail and/or if a potential ground rail is a ground rail, as discussed herein. In one embodiment, after the server has determined a net A to be a potential power rail, then the server adds power rail ratings depending on the couplings to the net. For example, if net A is coupled to a large number of PMOS transistors and coupled to a cathode terminal side of a diode, then the server assigns the net A with a accumulated power rail rating of 12 (10 for being coupled to the large number of PMOS transistors and 2 for being coupled to the cathode terminal side of a diode). The accumulated power rail rating is a summation of associated power rail ratings of determining factors. Likewise, the accumulated ground rail rating is a summation of associated ground rail ratings of determining factors.

In one embodiment, the determining factors are modified based on user input, topology, a frequency of a determining factor, and the like. For example, if the frequency of a determining factor is large compared to frequencies of other determining factors, then the determining factor with a large frequency may have the power rail rating and/or ground rail rating lowered so as not to dominate a power rail and/or a ground rail determination. Alternatively some embodiments may be practiced without such specific details, such as how much a determining factor may be modified, ranges for modification, dominance determination, dominance offsetting, and the like. In one embodiment, a server may reduce the accumulated power rail rating or an accumulated ground rail rating if a determining factor negatively influences a potential power rail or a potential ground rail, respectively. For example, if the server has identified a net B to be a potential ground rail then determines that net B is coupled to a cathode terminal side of a diode, the server may reduce a accumulated ground rail rating by −3, as indicated in column (406) cross-referenced with the determining factor (450) for a net coupled to a cathode terminal side of a diode. Thus, the server uses both positive and negative determining factors to determine if a net is a power rail or a ground rail.

Returning to FIG. 3, let us again review an example of a binning mechanism that organizes and counts the connections and connection types for a particular net. The net in consideration (30) is examined for all primitive terminals to which it connects. Each primitive terminal type is counted in a set of type-oriented bins (31) according to the granularity required for the ultimate determination. For example: connections to PMOS source and drains are counted together, while connections to PMOS bulk are counted separately. Within the set of type-oriented bins (31), there exist dependent voltage-oriented bins (32), used for counting connections according to device voltage. For example: the net (30) may connect to a number of PMOS bulk terminals, and that number is counted in a single bin among xx31, but within those connections, some portion are to 2-volt PMOS bulk and another portion to 4-volt PMOS bulk. These portions of 2-volt and 4-volt are counted within the bins (32). This binning mechanism thus provides the raw data for FIG. 8.

Returning to FIG. 4, let us again review examples of nets that match, or don't match, the profiles of acceptable power/ground rails. A net (40) has comparatively few PMOS source/drain connections (41), few NMOS source/drain connections, and no MOS bulk connections. These factors don't fit the mathematical description of a power net, ground net (e.g. doesn't fit key (44)), and thus help the system determine that net (40) is a non-rail net. Furthermore, net (40) also has connections to MOS gates (42) that are roughly equal in number to the connections of MOS source/drain, making net (40) further certain to be merely a plain signal net, rather than a power/ground rail net.

By contrast, net (43) has a high count of PMOS source/drain and PMOS bulk, with no NMOS source/drain or bulk, which is sufficient in at least one embodiment to make net (43) a determined power rail. Furthermore, net (43) has some connections to Capacitor Positive terminals, a condition that adds strength to its determination as a power rail. The characteristic profile of net (43) give it a particular shape as a "key" (mathematical description) that allows it to fit into the acceptance profile (44) of a power rail, thereby solidifying the determination that net (43) is a power rail in at least one embodiment.

Nets (40), (45), (46) have significantly different profiles and cannot fit into the acceptance profile or mathematical description (44), thereby preventing said nets from being determined as power rails.

Net (46) has the profile of a ground rail for at least one embodiment. That is, net (46) has a significantly high number of NMOS source/drain connections, and a significantly high number of NMOS bulk connections.

In contrast to net (46), net (45) is similar to a ground rail but the profile is not exactly sufficient. Because net (45) lacks the connections to NMOS bulk terminals, net (45) does not satisfy the acceptance criteria for a ground rail and is ultimately rejected in at least one embodiment. Net (45) is an anomaly net, seemingly close to a rail in profile but yet not a rail. Net (45) is an example of a Random Access Memory (RAM) bit line. A bit line connects to a high number of NMOS source/drains (the pass-gates into memory bit cells), but does not connect to any significant number of NMOS bulk terminals. That may be the deciding factor against net (45) in at least one embodiment.

By providing enough acceptance "keyways" or mathematical descriptions such as (44), that are, acceptable profiles of certain power/ground rails, the invention is able to determine a variety of power/ground rails simply and effectively.

Figure 9:
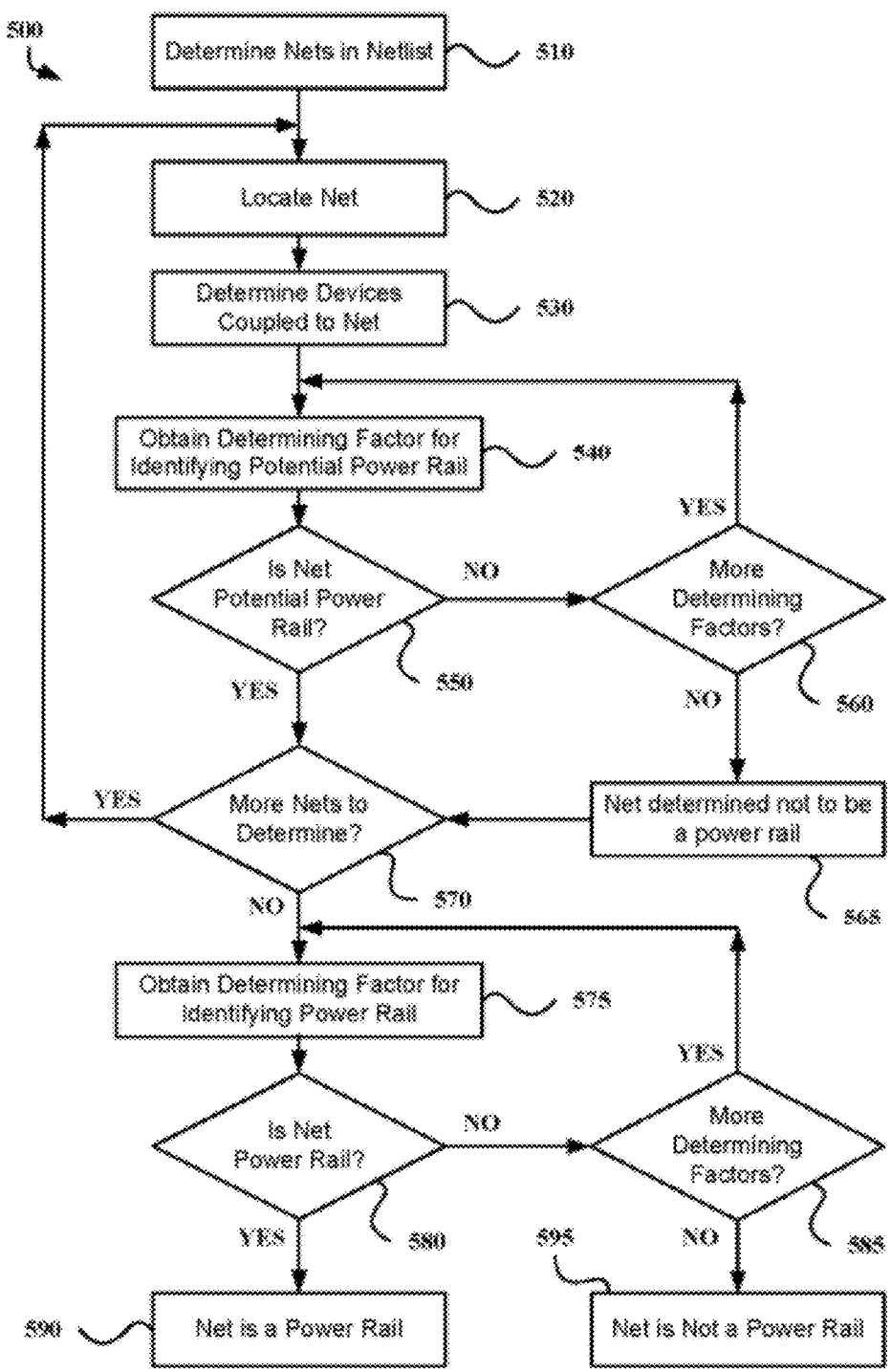
FIG. 9 illustrates a flow diagram of one embodiment of the invention's methods.

FIG. 9 illustrates a flow diagram (500) of computer (server) software that implements some of the method's various steps or algorithms. The flow diagram depicts various steps for a server to determine whether or not a net is a potential power rail, and if true then determine if the net is a power rail. The server (e.g. analysis computer), as discussed herein, may use software similar to the flow diagram (500), to determine whether or not a net is a potential ground rail, and if true then further determine if the net is a ground rail.

In step (510), the server determines one or more nets in a netlist that are to be evaluated for whether or not the net is a power rail. In one embodiment, the nets to be evaluated are user defined. In one embodiment, a prerequisite is used to determine which nets are to be evaluated, such as having a minimum number of device couplings, for example 5 device couplings. In one embodiment, discrete sub-circuits are identified and evaluated as chunks.

In step (520), the server identifies/locates one net to be evaluated within the netlist. In one embodiment, the net is determined randomly. In one embodiment, the net is selected in a topology approach based on proximity to a previously evaluated net. In one embodiment, the net is located based on an identification contained in the netlist, for example, the server evaluated nets alpha-numerically based on a netlist identification.

In step (530), the server determines devices coupled to the net. The couplings are interpreted from the netlist.

In step (540), the server obtains determining factors based on the couplings and/or the devices to identify if the net is a potential power rail, as discussed herein.

In step (550), the server determines if the net is a potential power rail. In one embodiment, the server determines if the net is potential power rail if the accumulated power rail rating has reached a threshold. For example, if the accumulated power rail rating is 50 and the threshold for the net to be a potential power rail is 45, then the server determines that the net is a potential power rail. If the server has determined the net to be a potential power rail, in step (570) the server checks if there are more nets to determine for potential power rails. If the server has not yet determined the net to be a potential power rail, then in step (560), the server determines if there are more determining factors.

In step (560), if there are more determining factors to be used to determine whether the net is a potential power rail, then steps (540) and (550) are repeated using another determining factor. If there are no more determining factors to be used to determine if the net is a potential power rail, then the server in step (565) identifies the net to not be a power rail, and proceeds to step (570).

In step (570), the server checks to see if there are more nets to determine for being a potential power rail, as discussed above. If there are more nets to be determined for being a potential power rail, the steps (520) through (550) are repeated. If there are no more nets to be determined for being a potential power rail, the process continues to step (575).

In one embodiment, if the server has not identified any (or too few) potential power rails, and there are no more nets to be determined for a potential power rail, then the server may further lowers the threshold for the potential power rail determination, and repeat the process. For example, if the original threshold for a net to be a potential power rail is 50, and too few power rails are identified, then the server may lower the threshold to forty. In one embodiment, the server may increase and/or decrease a power rail rating criteria of one or more determining factors to obtain a similar effect as changing a threshold. For example, if there are too few potential power rails, the server may increase the power rail rating criteria of the number of devices coupled to a net from 7 to 15, thus increasing the likelihood that the accumulated power rail rating will exceed a particular threshold.

In step (575), the server obtains another determining factor for identifying if the potential power rail as a power rail (in one embodiment, by exceeding a power rail threshold), thus further determining (580) if the net is or is not a power rail.

If the server determines that the potential power rail is not yet a power rail based on the determining factor(s) (and in one embodiment, not yet exceeding a power rail threshold), then in step (585), the server then seeks another determining factor to be used to determine if the potential power rail is a power rail. If there are more determining factors to be used for the determination (585), the process moves to repeat steps again starting with step (575). This process may repeat until there are no more determining factors (585). If by that point the net has not previously determined that the net is a power rail, then usually the sever will determine that the net is not a power rail (595).

Typically, the software algorithms represented by flow diagram (500) may be used repeatedly (not depicted) until all the nets within a netlist or a subnet have been determined to be either power rails, or not to be power rails.

In one embodiment (not depicted), the server may determine whether or not all of the nets are potential power rails prior to determining if any of the potential power rails are likely power rails. By determining all the potential power rails prior to further determination of likely power rails, a topology determining factor with regard to location and/or couplings of the potential power rails may be used to determine the likely power rails. For example, if net A and net B are coupled to the same devices, and both nets have been identified as potential power rails, the server may use a determining factor that uses this information to further determine that net A is and that net B is not a potential power rail (step one discussed herein) and/or to determine that net A is and that net B is not a likely power rail (step two discussed herein).

Similarly, software similar to flow diagram (500) may be used to determine a ground rail. That is instead of determining a potential power rail, the server determines a potential ground rail (step one discussed herein) and instead of determining a likely power rail, the server determines a likely ground rail (step two discussed herein).

Alternatively, some embodiments may be practiced without such specific details, such as prioritizing the determining factors to more efficiently determine potential power rails and/or likely power rails. For example, using determining factors that have greater positive or negative influences (as discussed herein) first and then using lesser positive and negative influencing determining factors if the server has not resolved the net to be or not to be a potential power rail and/or a likely power rail.

Figure 10:
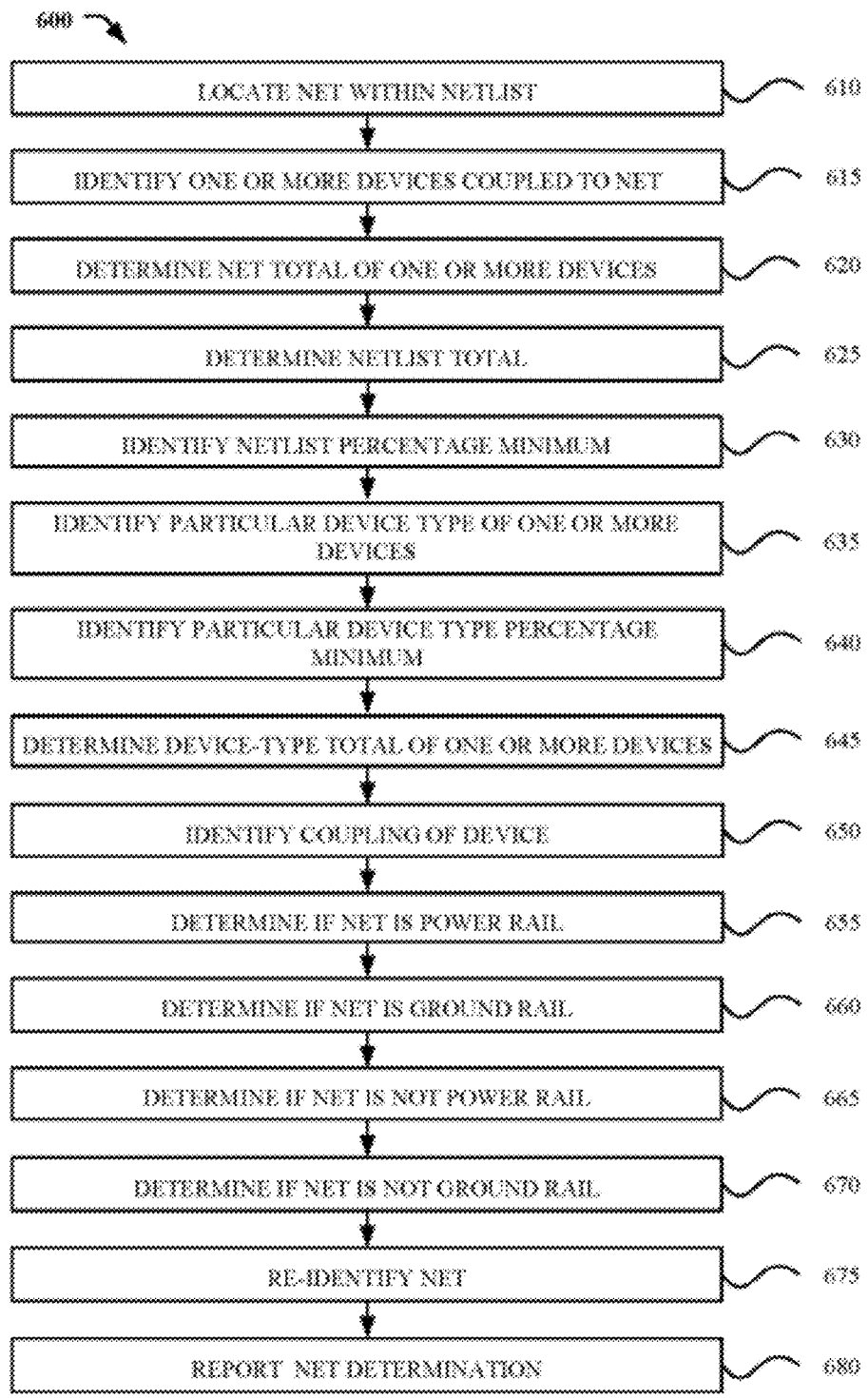
FIG. 10 illustrates a flow chart of one embodiment of the invention's methods.

FIG. 10 illustrates a flow chart (600), in accordance with embodiments. The flowchart (600) illustrates a server or other computer used to run the software that implements the inventions various methods, as discussed herein, determining if a net in a netlist should be a power rail or ground rail. In step (610), a server locates a net within a netlist as discussed herein.

In steps (615) through (650), the server obtains the various determining factors to be used during an identification of a net. In one embodiment, the determining factors are stored in memory to be later used by other nets. In step (615), the server identifies one or more devices coupled to the net, as discussed herein. In step (620), the server determines a net total of one or more devices, as discussed herein. In step (625), the server determines a netlist total of devices, as discussed herein. In step (630), the server identifies a netlist percentage minimum as discussed herein. In step (635), the server indentifies a particular device type of one or more devices as discussed herein. In step (640), the server identifies a particular device type total of one or more devices, as discussed herein. In step (645), the server determines a device-type total of one or more devices as discussed herein. In step (650), the server identifies a coupling of the device. In one embodiment one or more steps (615) through (650) are used to obtain determining factors. In another embodiment, all the steps (615) through (650) are used to obtain determining factors.

In step (655), the server determines if a net is a power rail, as discussed herein and in particular to the discussion of FIG. 9. In step (660), the server determines if a net is a ground rail, as discussed herein. In one embodiment, in steps (655) and (660), the server also determines if the net is a potential power rail and a potential ground rail, respectively. In step (665), the server determines if a net is not a power rail as discussed herein. In step (670), the server determines is a net is not a ground rail. In one embodiment, after a net is identified to be one of either a power rail or a ground rail, then the server identifies the net to be "not a ground rail" and "not a power rail", respectively.

In step (675), the server may re-identify a net is after determining net to be something other than what the net was initially identified, as discussed herein. For example, if a net is initially identified not to be a ground rail, and is later determined that the net is a ground rail, then the server re-identifies the net as a ground rail. Nets may be re-identified per user input, changes in thresholds, changes in power rail and ground rail ratings, changes in determining factors, and the like.

In step (680), the server reports, for a user, net identifications and/or discrepancies between an original labeling per the netlist and the net identification by the server. As discussed herein, a net identification is identifying a net to be a power rail, a potential power rail, not a power rail, a ground rail, a potential ground rail, and not a ground rail. In one embodiment, the potential power rail and potential ground rails are intermediate steps. In another embodiment, the server determines net to be power rails and ground rails without identifying nets to be potential power rails and/or potential ground rails, thus no reporting of the latter two is performed.

As the server analyzes the netlist, the user may interactively steer, direct, modify and change the netlist, to produce a desired circuit design. For example, the user may add devices, nets, connections, and the like. Furthermore, the server minimizes crunching thousands of calculations based on an inappropriate netlist. Additionally, the application may perform many of the setup functions, such as a net voltage setting based on the net identification. For example, if a net is determined to be a power rail, the server may set a default voltage of +5 volts to the net. Thus, the application may reduce setup effort by performing some setup steps, determine unidentified nets and misidentified nets, thereby alleviating troubleshooting time and effort.

Various alternatives, modifications and equivalents may be used to identify nets as power rails or ground rails. Alternatively, some embodiments may be practiced without such specific details. For example, each determining factor may have six ratings, one each for a power rail rating, a potential power rail rating, not a power rail rating, a ground rail rating, a potential ground rail rating, and not a ground rail rating, where each rating may influence the server with a different magnitude.

Various alternatives, modifications, and equivalents may also be used. For example, the steps to determine if a net is not a power rail may have a "not a potential power rail" identification is a step one approach of a two step approach, thus potentially removing the net from further consideration as a power rail earlier than previously discussed above. In another example, a user may interrupt the application and supply and/or revise user settings for thresholds, determining factors, ratings, and the like, and continue to perform other advanced troubleshooting techniques not discussed herein, such as deep circuit checks. Therefore, the above description should not be taken as limiting the scope of the invention which is defined by the appended claims.

Figure 11:
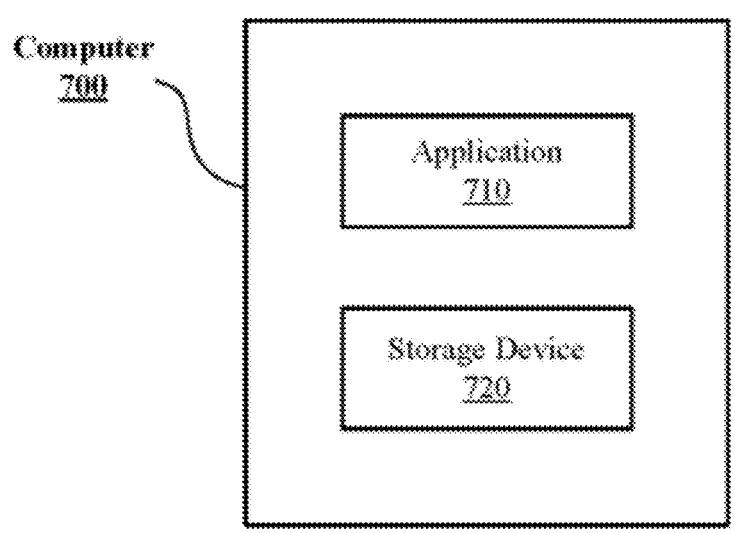
FIG. 11 illustrates a block diagram of a server or other computer based analyzer for rail identification within a circuit.

FIG. 11 illustrates a block diagram of a server or other computer analyzer (700) for power and ground rail identification within a circuit, in accordance with embodiments. The server (700) may be any type of computing device, such as a computer, and the like. It will generally comprise at least one computer processor (e.g. microprocessor), memory, often operating system software (e.g. Linux, UNIX, windows and the like), and at least the invention's circuit analysis software as described herein. As illustrated, the server (700) comprises an application (e.g. application software that implements the invention's various methods) (710), and a storage device (720). The application (710) is configured to run on the server (700), and configured to determine and/or identify if a net within a netlist is a power rail, is not a power rail, is a ground, and/or is not a ground rail based on determining factors as discussed herein. The application (710) may make recommendations to a user and report net identifications and/or discrepancies between a netlist identified net and the server (700) identified net, as discussed herein. The application (710) may also receive an acceptance, a confirmation, and/or a clarification from the user, as discussed herein. The storage device (720) is configured to store information, such as devices, device types, devices couplings, determination factors, net couplings net information, netlist information such as a topology, and the like, as discussed herein.

In various embodiments, the server (700) contains a computer readable medium having embodied thereon a program, the program being executable by a computing device for performing a method for rail identification within a netlist and reporting via the application (710). The program is configured to locate a net within a netlist, identify one or more devices coupled to the net, at least partially based on the one or more devices determine if the net is a power rail, and report the net determination, and the like, such as to determine is the net is a ground rail.

Further Discussion

Suggesting/Finding Power Nets

As previously discussed, the invention's automated algorithms (e.g. power net seeker algorithms occasionally referred to in the alternative as the "power net seeker") search for nodes that act as power supplies, and/or power returns. In some embodiments, the power net seeker uses a two-step approach, 1) establish deterministic facts and/or connections, and 2) weight the facts and/or connections. For example, the power net seeker looks at a circuit and from heuristics (a preponderance of various facts) determines the net to be a power net. As an example, net is candidate for being a power rail for various reasons such as, a statistically high number of PMOS transistors connected to a source and/or a PMOS drain.

Some facts that may be indicative of a power net are a relatively large number of device connections, diode as a cathode of diode is connected to net, capacitor is connected to net, MOS transistor is used as a capacity and connected to the net, transistors are wired in a current mirror and connected to the net. Additionally, the bulk terminal of MOS transistor is connected to net which is an indication that the net is a power rail.

In contrast other nets and may not be considered power rails, as these nets have few connections. The nets have insufficient evidence for the power net seeker to make a determination that nets and are power nets.

In a corresponding manner, the power net seeker may determine the net to be a ground node, as there are NMOS transistors, a relatively large number of device connections, and a diode has the anode side coupled to net.

The power net seeker may identify one ground rail from two similar nets. The power net seeker processes the culmination of the facts learned from the connections to power node and/or ground nodes. Additionally, other heuristics are used to determine nets, such as looking at the circuit topology.

A net may be determined to be a ground net candidate for a ground rail based on the large number of connections to devices. Now the Power net seeker may use the totality of facts to verify that the ground net candidate is an actual ground net. In one embodiment, the power net seeker identifies all power rail candidates, and then based on the topology, removes power rail candidates from consideration and/or adds new candidates.

In one embodiment, after the power net seeker has identified a ground candidate, the power net seeker uses facts/connections to determine if candidate qualifies as a ground. The power net seeker bases the determination on the numerous NMOS transistors, and the fact that device is connected to source terminals, but find bulk terminals connected to some other net. The power net seeker may determine that the top configuration of circuit, which is a common memory array configuration used as pass gates, tends to represent a memory bit-line rather than a ground node, and thereby remove the net as a candidate ground line.

In contrast, the power net seeker may determine that another net, which also has a high number of NMOS transistors connections, but wherein the NMOS bulk terminals are connected to a specific net instead of some other net. The power net seeker may weigh this difference heavily and regard the net are a ground node. Furthermore, the net is connected to multiple capacitors, thus indicating that net is a ground.

Power Supply Groups

An alternative algorithm (here called "the grouper algorithm" or alternatively "the grouper") can determine groups of power nets. As circuits have at least two power rails, (power and ground), and sometimes need to isolate power, the grouper may group together the at least two power rails. A power rail grouping may be used for testing, finding violations, and the like.

The grouper, by looking at configuration, topology, devices, and connections, associates the power rails into groups.

A group is one or more return rails and one or more power rails that supply power to one or more devices within the group. In one embodiment, a group is also referred to as a domain. The domain includes the rails, the devices, and the intermediate nets. In another embodiment, the group is referred to by the included power rails. In another embodiment, the group only consists of power rails.

In one embodiment, the Power net seeker has determined two power supply rail nets, and two return rail nets. In one embodiment, after the power net seeker determines the power rails, the grouper determines the groupings.

The grouper determines the groups based on topology, that is, the configuration of device couplings. The grouper considers the following device couplings: the combination of multiple transistors that extend between (coupled to) the power and return rail nets.

In one embodiment, by statistical weighting, the grouper identifies the electrical current paths, such as the paths between power and return rail nets. In various embodiments, the grouper determines groupings based on a relatively high and/or relatively low number of connections. For example, a supply rail has a path to another rail via a diode. The grouper looks to the number of paths to other nets, wherein the grouper finds a higher number of paths to net than the number of paths to net, thereby grouping nets.

Suggesting Voltage Levels

Another algorithm, here called "the power net voltage suggester" may be used to suggest a voltage for a particular power net.

Here assume that the circuit being analyzed comprises a power rail, another power rail, a ground rail, and transistors.

After the power net seeker has determined the power rails. The power net voltage suggester can then suggest or determine an estimated voltage for these power rails, based on the properties of the various transistors and other devices that are coupled to the power rails. This engine or algorithm may assume and/or determine that the voltage rating of the transistors is the same as the power supply is intended to operate the transistors. The power net voltage suggester also may consider inconsistencies. For example, the presence of a certain transistor has a different power rating, but the majority is deterministic of a voltage of the power rail.

Similarly, a net has a majority of transistors that are the same as each other, thereby the net is suggested a power voltage to operate with.

As transistors are designed to be power efficient, that is power conservative and not power wasteful, the power net voltage suggester may use a power rating of the transistor to determine the voltage at the power rail. In one embodiment, the power net voltage suggester assumes that transistors are designed to operate at a specific voltage. Thus, the power net voltage suggester may determine the power rail to be optimal with a voltage to operate the transistor.

In some embodiments, the power net voltage suggester notifies that the transistor has a different operating voltage specification and/or rating than another transistor, so the power net voltage suggester relays this information to the engine for possible error checking, violations, and the like.

As the channel length changes, the transistor voltage determinator may choose typical voltages. In one embodiment, choice voltages are standard increments. In one embodiment, the transistor voltage determinator uses a table (for the common increments), and see where the channel length is. For example, the MOS transistor has a length of 0.18 micron and MOS transistor has a 0.12 micron. Then from the table, the voltage determinator determines the voltages of the transistors and to be 2.0 and 1.2 volts, respectively. In one embodiment, ranges of voltages may be anything from 20 volts down to 0.8.

In one embodiment, by using the voltage determinator, the engine performs all the function of a setup, thereby saving user input time and effort. In another embodiment, the user setup effort is reduced. In another embodiment, the engine performs most of the setup and the user, optionally, adjust and/or tweaks the setup. Additionally, process setups and/or loadings may be alleviated.

The setup module validates power rails, identifies circuit types, and/or determines user intent of the power rails. Checking the set-up may be an important step during circuit analysis, as garbage in will yield garbage out.

Power Rail Validation

As previously discussed, a circuit comprises an assortment of devices and nets that are all defined to be at different voltages. Consider the case where a power net is coupled to transistor, resistor and diode. All voltage per specifications of these devices are in sync with the voltage on the power net, except that one transistor has a lower power spec than the power at the power net. The here the invention's setup module notify the user that this particular transistor may have an issue—either the voltage spec at transistor is wrong, or the power at the net is wrong.

To resolve the inconsistency, the setup module may look at other instances of this type of transistor elsewhere within the circuit.

The setup module notifies the user of a potential problem and/or suggests a solution to a problem. For example, if the setup module identifies a device is over-voltage, this may be a problem, and the system may submit a recommendation to correct an incorrect device hookup. In another example, the setup module may find that an error has occurred multiple times throughout the circuit (or a majority of times throughout the circuit). In this case, then the underlying problem may be an incorrect specification for a rating of a device type. Alternatively, the setup module may consider that if the device is over-voltage in many cases within a power group, then the problem may be a wrong voltage assigned to the power supply.

In one embodiment, the user may elect to clear/bypass any errors, so as to allow the engine to operate with inconsistencies. In one embodiment, the user may be presented with a list of alternative remedies, and after the user selects the alternative or alternatives, the specification will be changed either temporarily to permit current operation or changed as a configuration change for additional operations.

Thus to summarize in part, the invention may be a method for identifying a power rail within a circuit. This embodiment will comprise locating a net within a netlist; identifying one or more devices coupled to the net; and at least partially based on the one or more devices, determining if the net is a power rail, and reporting the net determination.

The devices may, for example be PMOS transistors, and the method may further determine if the PMOS transistor is coupled to an NMOS transistor, and if the NMOS transistor is coupled to a ground rail. If so then the net may be determined to be a power rail based, at least in part, on the finding that the PMOS transistor is coupled to the net, and the NMOS transistor is coupled to the ground rail.

Alternatively the method may also determine a net total of the one or more devices, wherein the net total is a total number of devices coupled to the net; and determine a netlist total, wherein the netlist total is a total number of devices in the netlist. The method then also identifies a netlist-percentage minimum, wherein the net is determined to be a power rail if a percentage of the net total to the netlist total is equal to or greater than the netlist-percentage minimum, such as a minimum value of ten percent.

The above methods may also further identifying a particular device type (such as a PMOS transistor) of the one or more devices; determine a device-type total (wherein the device-type total is a total number of devices of the particular device type coupled to the net), and also determine a net total, wherein the net total is a total number of devices coupled to the net. The method may further identify a identifying a device-percentage minimum, and determine that the net is a power rail if a percentage of the device-type total to the net total is equal to or greater than the device-percentage minimum.

Alternatively, the device may be an NMOS transistor, and the method may further determine if the NMOS transistor is coupled to a PMOS transistor, further determine if the PMOS transistor is coupled to a power rail. If so then the net may be determined to be a ground rail based, at least in part, on the finding that the NMOS transistor is coupled to the net, and the PMOS transistor is coupled to the power rail.

Alternatively the method may determine that one of the devices is a capacitor. If so, then the net may be determined to be a power rail based, at least in part, on the fact that one or more of the devices is a capacitor.

Alternatively, the method may determine that one of the devices is an MOS transistor, and further determine that the MOS transistor is functioning as a capacitor. If so then the net may be determined to be a power rail based, at least in part, on the fact that one of the devices is a MOS transistor functioning as a capacitor.

Alternatively the method may determine that one or more of the devices is a MOS transistor that, in the case where the device is a MOS transistor, the device has a device terminal such as a bulk terminal, source terminal, or drain terminal connected to the net, in which case the net may be determined to be a power rail based, at least in part, on this finding.

Alternatively the method may determine that one or more of the devices is a diode, and in the case where the device is a diode, the device has a cathode side coupled to the net, in which case the net may be determined to be a power rail based, at least in part, on this finding.

Alternatively, the method may determine that if the net is a ground rail at least in part based on the device connected to the net. For example, if the device is an NMOS transistor, or a diode coupled to the net by the diode's anode side, then the net may be determined to be a ground rail based, at least in part, on this finding.

Alternatively, the method may determine the total number of devices coupled to the net (net-device total), and then determine the total number of devices connected to the netlist (netlist total). The method may then determine a netlist percentage minimum by identifying NMOS bulk terminals connected to the net, and determine that the net is a ground rail if the percentage of the net total to then netlist total is equal or greater to the netlist percentage minimum, or determine that the net is not a ground rail if the NMOS device bulk terminals do not couple to the net.

While the invention is described in conjunction with various embodiments, it is understood that they are not intended to limit the invention to these embodiments. On the contrary, the invention is intended to cover alternatives, modifications and equivalents, which may be included within the spirit and scope of the invention as defined by the appended claims.

The invention claimed is:

1. A method of automatically identifying, in a specification of a netlist of a complex integrated circuit chip comprising a plurality of nets, without requiring a-prioi knowledge of which of said nets are power or ground nets, those nets that are statistically likely to be power or ground nets, said method comprising:

representing said netlist in a computer readable form;

using at least one computer processor, software, and memory to analyze said nets from said netlist, and for each analyzed net:

a) determining electrical properties of each device or device terminal that is coupled to said analyzed net, and sorting said electrical properties for each device or device terminal into a series of bins, thereby creating a mathematical description of overall electrical properties of various devices that are coupled to said analyzed net;

b) comparing said mathematical description with at least one preset mathematical description of a power net or a ground net; and if said mathematical description falls within said at least one preset mathematical description of a power net or a ground net, then at least provisionally determining that said analyzed net is a power net or a ground net, and storing a result of said determining in memory for later use.

2. The method of claim 1, wherein said devices coupled to said analyzed net include PMOS transistors, NMOS transistors, diodes, and capacitors, and wherein said bins comprise a total number of device terminals coupled to said analyzed net, a PMOS transistor bulk terminal bin, a PMOS transistor source and drain terminal bin, a NMOS transistor bulk terminal bin, a NMOS transistor source and drain terminal bin, a diode cathode bin, a diode anode bin, and a capacitor terminal bin.

3. The method of claim 2, wherein one of said at least one preset mathematical description of a power net or a ground net is that a bin indicating that the analyzed net is coupled to a capacitor has a capacitor count that is greater than a preset percentage of the total number of device terminals coupled to said analyzed net, and is also greater than one.

4. The method of claim 1, further analyzing said netlist, determining a total number of each type of different devices in said netlist;

using said total number of each type of different devices in said netlist to adjust said at least one preset mathematical description of a power net or a ground net; and using said adjusted at least one preset mathematical description of a power net or a ground net to at least provisionally determine that said analyzed net is a power net or a ground net.

5. The method of claim 1, further analyzing the provisional determination that said analyzed net is a power net or a ground net by determining if a total number of provisionally determined power nets or ground nets is below a preset minimum, and if so making the at least one preset mathematical description of a power net or a ground net progressively less stringent, repeating the analysis until the total number of provisionally determined power nets or ground nets exceeds said preset minimum.

6. The method of claim 1, further analyzing the provisional determination that said analyzed net is a power net or a ground net by analyzing a topology of said netlist, and determining that if two provisionally determined power nets are serving the same devices, then choosing one provisionally determined power net as being a true power net, and determining that the other provisionally determined power net is not a true power net.

7. The method of claim 1, further providing at least some information represented as being a-prioi knowledge of which of said nets are power or ground nets, and using said provisional determination that said analyzed net is a power net or a ground net to check an accuracy of said information represented as being a-priori knowledge.

8. The method of claim 1, further being used in a computerized software implemented method to identify both specific floating transistor gates and causes of said specific floating transistor gates in an electronic circuit design comprising a plurality of electrically interconnected transistors.

9. The method of claim 1, further being used in a computerized software implemented method to define power and ground nets for a purpose of running circuit simulation software.

10. The method of claim 1, further being used in a computerized software implemented method to identify voltage mismatch problems in which either transistors are reached by a higher voltage power than allowed, or logic stages cannot adequately switch because they are reached by a lower voltage power than allowed.

11. The method of claim 1, further being used in a computerized software implemented method to identify fanout problems caused by logic drivers that are served by inadequate power nets or not connected to power nets, thereby causing said logic drivers to fail desired performance requirements.

12. The method of claim 1, further being used in a computerized software implemented method for integrated circuit chip layout, placement, or routing, wherein said layout, placement, or routing is directed to give a priority to power nets so that circuit blocks can be positioned near the power nets that provide their power, and/or power nets can be physically routed and shaped according to the power they must carry.

13. The method of claim 1, further being used in a computerized software implemented method for verifying integrated circuit layout.

14. The method of claim 1, wherein said plurality of nets is greater than 100,000 nets.

15. The method of claim 1, further being used to determine a likely voltage of said provisionally determined power net, wherein said likely voltage is determined by analyzing voltage requirements of each device or device terminal that is coupled to said provisionally determined power net, and determining a likely voltage or a likely current that is consistent with the voltage requirements and/or current requirements of each device or device terminal that is coupled to said provisionally determined power net.

16. The method of claim 15, wherein said device is a transistor, and wherein determining the voltage requirements of said device or device terminal is determined by examining a geometry of said transistor (specified as Width and Length in the netlist), and thereby determining that said transistor is likely a high voltage device (high value of L) or a low-voltage device (low value of L).

17. The method of claim 16, further using high voltage status or low voltage status of said transistor to then determine that the provisionally determined power net is intended to be a high voltage power net or a low voltage power net.

18. The method of claim 15, wherein said device is a transistor, and further providing a definition of an intended operating voltage of said transistor, and using said definition to determine an intended voltage of the provisionally determined power net.

19. The method of claim 15, wherein said device is a transistor, said provisionally determined power net has a plurality of different assorted transistors with different voltage requirements, wherein the likely voltage of said provisionally determined power net is determined based on a statistical dominance of one of the different assorted transistors over the others.

20. The method of claim 15, further determining a total number of devices connected to said provisionally determined power net, and a likely power consumption of each device, and determining a likely current consumption of said provisionally determined power net based on the total number of devices and the likely power consumption of each device.

21. The method of claim 20, wherein said devices are connected between a provisionally determined power net and a provisionally determined ground net.

* * * * *